United States Patent [19]

Hotmer

[11] 4,369,052
[45] Jan. 18, 1983

[54] FORMING SUPERVISORY CONTROL MEANS FOR GLASSWARE FORMING MACHINES

[75] Inventor: Paul A. Hotmer, Toledo, Ohio
[73] Assignee: Owens-Illinois, Inc., Toledo, Ohio
[21] Appl. No.: 245,249
[22] Filed: Mar. 19, 1981
[51] Int. Cl.³ .............................................. C03B 9/40
[52] U.S. Cl. ..................................... 65/160; 65/158; 65/163; 65/DIG. 13; 364/473; 364/476
[58] Field of Search ......... 65/158, 160, 163, DIG. 13; 364/473, 476

[56] References Cited

U.S. PATENT DOCUMENTS 4,247,317 1/1981 Wood et al. .................. 65/29
4,266,961 5/1981 Wood .......................... 65/29

OTHER PUBLICATIONS

"1S Goes 1C", The Glass Industry/May 1974, pp. 8, 9, 10, 32.

Primary Examiner—Arthur D. Kellogg
Attorney, Agent, or Firm—Gerald T. Welch; M. E. Click; D. H. Wilson

[57] ABSTRACT

A control system for individual section glassware forming machines is disclosed which includes a first storage means for storing a control program defining a series of predetermined forming steps and job history and other data from the individual sections. A plurality of individual sections control means, individual to each of the individual sections of the glassware forming machines, generate control signals to the glassware forming means in accordance with the control program. A forming supervisory control means is connected between the first storage means and the individual section control means for loading the control program and job history data into the individual section control means and for reading operating data from the individual section control means. A plurality of machine supervisory control means are provided, each machine supervisory control means being connected between the forming supervisory control means and the individual section control means associated with one of the glassware forming machines. The machine supervisory control means function as multiplexers controlling the bidirectional flow of data between the forming supervisory control means and the individual section control means. This system includes a display device for generating a visual display of operating data including a representation of at least one forming operation along a first axis and a representation of the duration of the forming operation along a second axis.

5 Claims, 14 Drawing Figures

| IS MACHINE TIMING | | |
|---|---|---|
| # OPERATION | ON | OFF |
| 1 SCOOP | 300 | 40 |
| 2 BLANK CL | 5 | 174 |
| 3 THIMBLE | 24 | 190 |
| 4 CNTR BLOW | 105 | 185 |
| 5 FUNNEL | 10 | 70 |
| 6 PLGR UP | 25 | 60 |
| 7 BAFFLE 1 | 40 | 60 |
| 8 BLANK OP | 200 | 303 |
| 9 INVERT | 270 | 320 |
| 10 NR OPEN | 320 | 345 |
| 11 REVERT | 320 | 235 |
| 12 SETL BLOW | 40 | 60 |
| 13 FINL BLOW | 25 | 165 |
| 14 MOLD CLOS | 296 | 180 |

FIG. 13

FORMING SUPERVISORY CONTROL MEANS FOR GLASSWARE FORMING MACHINES

BACKGROUND OF THE INVENTION

1. Field of the Invention

The present invention relates in general to control systems for glassware forming machines and in particular to a forming supervisory control means for electronically controlling individual section glassware forming machines and gathering information therefrom.

2. Description of the Prior Art

The individual section glassware forming machine is well known and includes a plurality of sections, each having means for forming glassware articles in a timed, predetermined sequence of steps. Typically, the sections are fed from a single source of molten glass which forms gobs of the molten glass. The gobs are distributed to the individual sections in an ordered sequence. The individual sections are operated in synchronism in a relative phase difference such that one section is receiving a gob while another section is delivering a finished glassware article to a conveyor and one or more other sectins are performing various ones of the intermediate forming steps.

The forming means in each section are typically operated from pneumatic motors or actuators. In early prior art machines, the pneumatic motors were controlled by a valve block which, in turn, was controlled by a timing drum driven from a line shaft which synchronized all parts of the machine. The timing drum was later replaced by an electronic control means including a master unit which was responsive to a clock pulse generator and a reset pulse generator, both generators being driven by the line shaft. Such a control system is disclosed in U.S. Pat. No. 3,762,907. Other prior art control systems utilize digital computers with memory and associated program storage for providing a means for programming groups of related functions in accordance with certain boundary events. Such a control system is disclosed in U.S. Pat. No. 3,905,793.

A later prior art control system includes a machine supervisory control means connected to a separate section control means for each of the individual sections and to a data storage means. The machine supervisory control means loads each section control means with a control program and timing data from the storage means for forming a specific article of glassware. The machine supervisory control means also obtains the current timing data from each of the section control means at predetermined intervals and sends it to the storage means. Individual forming operation times can be adjusted while the machine is running. Such a control system is disclosed in U.S. Pat. No. 4,152,134.

SUMMARY OF THE INVENTION

The present invention concerns a control system for electronically controlling individual section glassware forming machines. Each machine includes a plurality of individual sections for forming glassware articles. Means for forming gobs of molten glass, and means for feeding the gobs of molten glass to the individual sections are provided. Each of the individual sections includes forming means for forming the glassware article in a series of predetermined forming steps in response to a plurality of control signals. The machine also includes an electronic control means for generating the control signals.

The control system includes a first means for storing control programs defining the series of predetermined forming steps and for storing section timing data for the forming steps of each individual section. The first storage means is also utilized to store job history and other operating information from each of the individual sections. A plurality of section control means, individual to each of the individual sections, are provided for generating the control signals to the glassware forming means in accordance with the control program and section timing data. A plurality of machine supervisory control means, each of which is connected to the plurality of section control means associated with a corresponding machine, load the control programs and the section timing data into the section control means and read the current job history data. Each of the machine supervisory control means includes a second storage means for temporarily storing the job history and other data from the section control means.

A forming supervisory computer is connected between the first storage means and each of the machine supervisory control means. The forming supervisory computer loads the control programs and section timing data through the machine supervisory control means into the second storage means. The computer also reads the job history data and other machine operation data from the second storage means and reports and updates various forms of management and job history information upon operator request through an input/output device.

The data stored in the first storage means represents operating characteristics of the glassware forming means of the glassware forming machines. The forming supervisory computer is connected to an output device for generating a visual display of management and job history information from the stored data. The output device can be, for example, a strip-chart recorder or a cathode ray tube.

It is an object of the present invention to provide a forming supervisory control which increases the efficiency and accuracy of individual section glassware forming machines.

It is another object of the present invention to provide a forming supervisory control which supports communication to multiple individual section glassware forming machines.

It is a further object of the present invention to provide an information gathering and reporting system for glassware forming machines.

Other objects and advantages of the present invention will become apparent to those skilled in the art from the following detailed description of the preferred embodiment when read in light of the accompanying drawings.

BRIEF DESCRIPTION OF THE DRAWINGS

FIG. 13 is a representation of a strip-chart printout of one set of timing data of an individual section of a glassware forming machine generated by the forming supervisory computer of FIG. 3.

DETAILED DESCRIPTION OF THE PREFERRED EMBODIMENT

Figure 1:
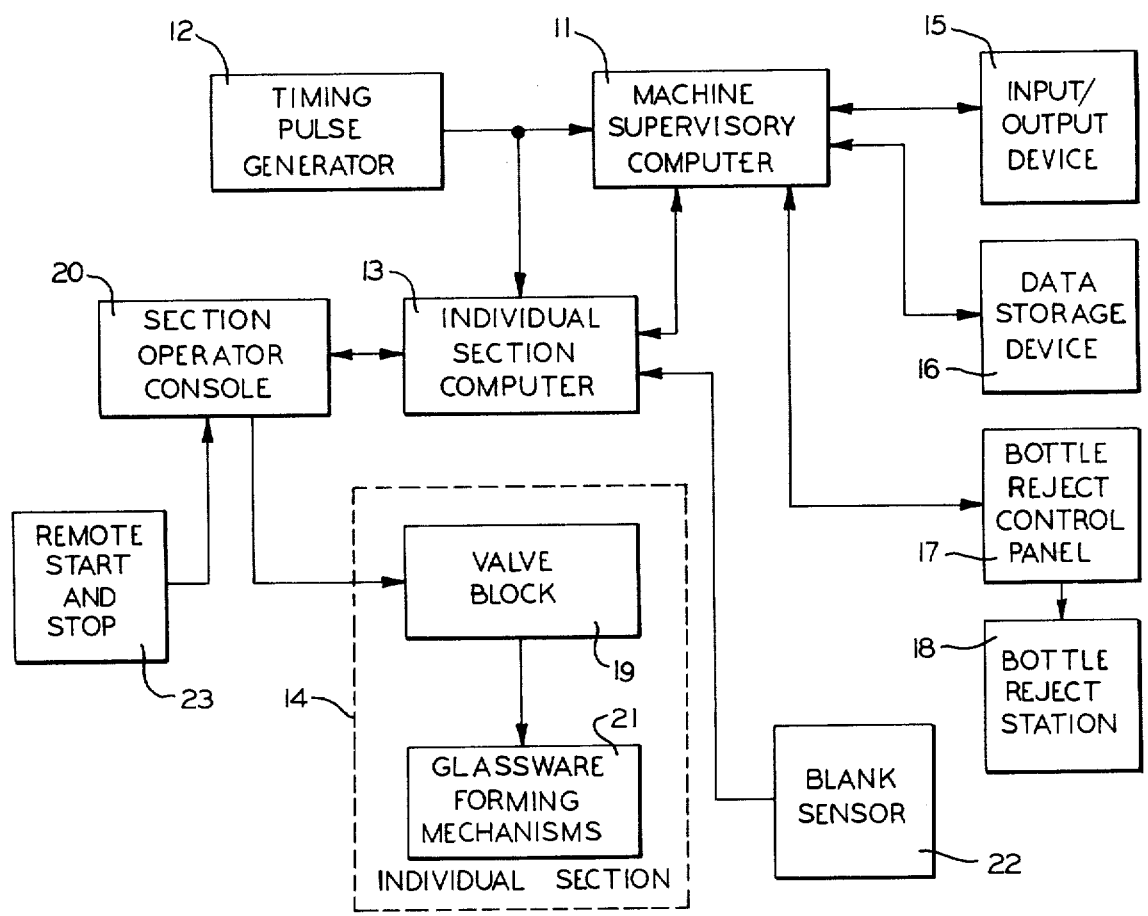
FIG. 1 is a block diagram of a prior art computer controlled individual section glassware forming machine.

Referring now to the drawings, there is illustrated in FIG. 1 a block diagram of an individual section glassware forming machine and associated electronic control system which is more fully described in U.S. Pat. No. 4,152,134. A machine supervisory computer (MSC) 11 and a plurality of individual section computers (ISC) 13 (only one is illustrated) receive a train of timing pulses from a timing pulse generator 12. The generator 12 typically can be one of the devices disclosed in U.S. Pat. Nos. 4,145,204 and 4,145,205. The MSC 11 is connected to each ISC 13 and each ISC 13 is connected to an associated individual section 14 of the glassware forming machine.

The timing pulse generator 12 generates a clock signal to the MSC 11 and the ISC 13, thus providing a reference for timing the machine cycle and the sequence of steps to be performed by the ISC 13. Typically, the machine timing is expressed in degrees and a machine cycle is 360° in length. Thus, 360 clock pulses, or some multiple thereof, comprise one machine cycle. The cycle for each individual section 14 is also 360°, but the cycle for all the sections can be offset from the start of the machine cycle by a different number of degrees to compensate for the difference in gob delivery time to each section. The timing pulse generator 12 also generates a reset signal after 360° of clock pulses which is utilized by the MSC 11 and the ISC 13 to define the end and the beginning of successive machine cycles.

An input/output device 15 and a data storage device 16 are both connected to the MSC 11 by a pair of bidirectional lines. The MSC 11 is also connected over a bidirectional line to a bottle reject control panel 17. The panel 17 includes a plurality of switches (not shown), each of which corresponds to a particular cavity of the mold in each individual section 14. If an operator desires to reject a particular article of glassware, he actuates the appropriate switch in the panel 17. The MSC 11 periodically scans the panel 17 to see if any switches have been actuated. When the MSC 11 senses an actuated switch, it will compare the reject synchronization value corresponding to the section of the rejected glassware with the current position. If these two values are equal, a reject control signal will be supplied to a bottle reject station 18 such that the appropriate bottle will be rejected.

The ISC 13 generates control signals to a valve block 19 through a section operator console (SOC) 20. The valve block 19 is connected to a plurality of glassware forming mechanisms 21 for actuating the forming mechanisms in a predetermined timed sequence of steps to form the articles of glassware. The valves in the valve block 19 are actuated by solenoids (not shown) which are controlled by signals generated in accordance with the control programs and timing data currently stored in the ISC 13. The valve block 19 and the glassware forming mechanisms 21 together comprise the individual section 14.

There is also shown in FIG. 1 a blank sensor 22 which generates a signal upon the detection of a gob at the mold in an individual section 14. The blank sensor 22 includes a blank detector circuit (not shown) for generating the signal to the ISC 13, which signal is utilized to adjust the timing of that individual section 14 to the presence of the gob rather than to a position related distribution time. The SOC 20 is connected to the ISC 13 and the valve block 19 and is used by the operator to make adjustments to the mechanism timing. The actuation of a particular valve may either be advanced or retarded by the operator with the use of the SOC 20. Although the SOC 20 is provided with start and stop controls, the SOC 20 is located on one side of the machine and is only easily accessible to the operator when the operator is on that side. A remote start and stop station 23 is provided and is typically mounted on the side opposite the corresponding SOC 20. Thus, the start and stop controls are easily accessible to the operator from both sides of the machine.

Figure 2:
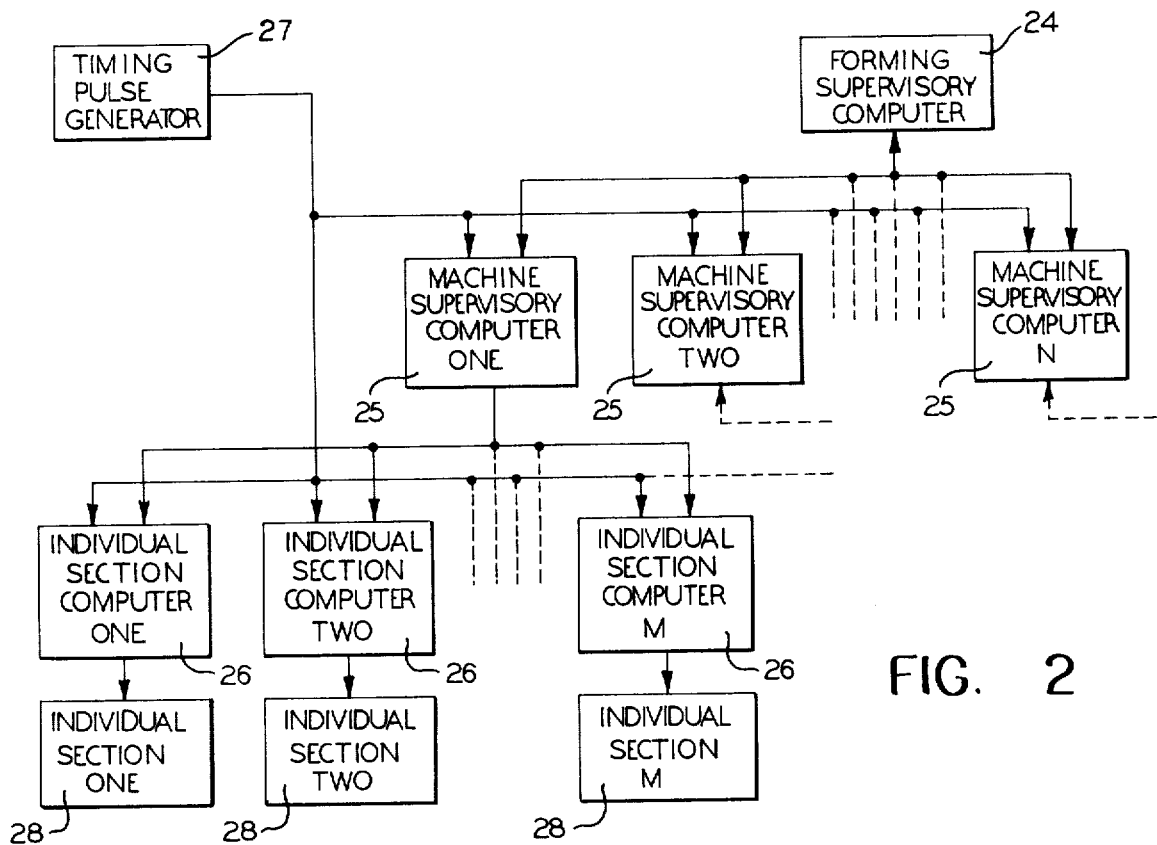
FIG. 2 is a simplified block diagram of a forming supervisory control system for individual section glassware forming machines in accordance with the present invention.

Referring now to FIG. 2, there is illustrated a forming supervisory control means in accordance with the present invention. A forming supervisory computer (FSC) 24 is connected to a plurality of machine supervisory computers (MSC) 25, ONE through N, and each MSC 25 is connected to a plurality of individual section computers (ISC) 26, ONE through M. Each MSC 25 and each ISC 26 receive a train of timing pulses from a timing pulse generator 27. The timing pulses from the generator 27 relate to the incremental position count of the glassware forming machine, as described above. The FSC 24, however, is regulated by an internal clocking mechanism which operates on a real time basis, as will be discussed below. Each of the ISCs 26 is connected to an associated individual section 28 of the glassware forming machine.

The FSC 24 typically can be a Model LSI-11/23 central processing unit operating under a Model RSX11M executive. The MSC 25 and the ISC 26 typically can be LSI-11/2 computers. Communications between the FSC 24 and the MSC 25 and between the MSC 25 and the ISC 26 can be achieved utilizing Model DLV11 serial input/output interface boards (not shown). The LSI-11/23, RSX11M, LSI-11/2, and DLV11 are all manufactured by the Digital Equipment Corporation of Maynard, Mass.

Initially, the FSC 24 utilizes each MSC 25 as a communications multiplexer to load each ISC 26 with a control program and timing data for controlling the associated individual section 28. Thereafter, each ISC 26 generates control signals in response to the control program and timing pulses from the timing pulse generator 27 to control the glassware forming cycle.

Figure 3:
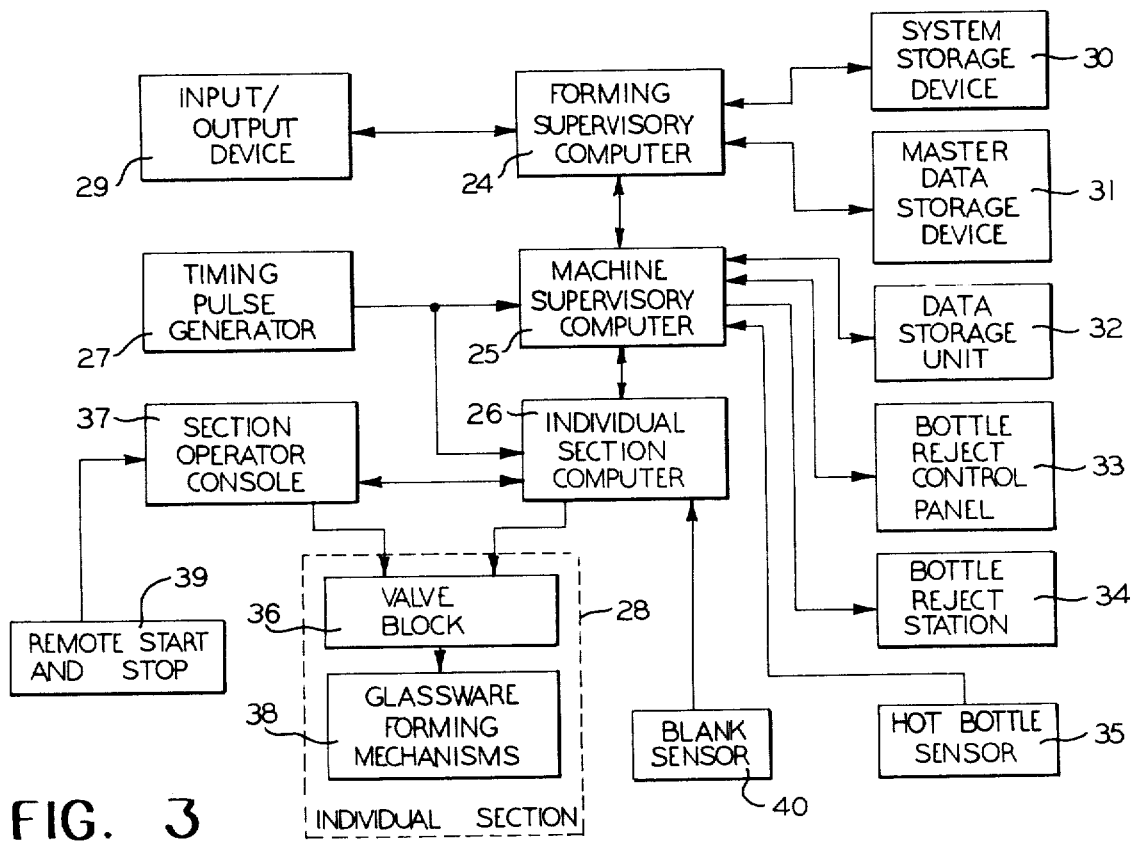
FIG. 3 is a more detailed block diagram of the control system and one of the individual sections of FIG. 2.

FIG. 3 is a more detailed block diagram of the control system and one of the individual sections of FIG. 2. The timing pulse generator 27 generates the train of timing pulses to the MSC 25 and the ISC 26. An input/output device 29 is connected to the FSC 24 by a bidirectional line. The input/output device 29 can be utilized to request information from or to program changes into the FSC 24. Although only one input/output device 29 is illustrated, it will be appreciated that any number of such terminals can be provided to enhance the overall flexibility of the system. For example, in addition to the single input/output device 29 provided to program and monitor the entire system, it may be desirable to provide additional terminals such that a machine operator can directly program or monitor a particular machine. The input/output device typically can be a Model LA-36 DECwriter teleprinter, a Model DMTP-3 strip printer, or a Model VT100 cathode ray tube display device. Communication between the input/output device 29 and the FSC 24 can be achieved utilizing the above-mentioned Model DLV11 serial interface board (not shown). The strip printer is manufactured by Practical Automation, Inc. of Shelton, Conn. and the remainder of above-mentioned equipment is also manufactured by the Digital Equipment Corporation.

The FSC 24 is also connected over bidirectional lines to a system storage device 30 and a master data storage device 31. The system storage device 30 is utilized to store the operating programs and routines for the FSC 24. The system storage device 30 typically can be a Model RL01 disk storage unit. If such a disk storage unit is utilized as the system device 30, a Model RLV11 disk drive controller (not shown) can be used to control data transfers between the FSC 24 and the system storage device 30. The master data storage device 31 is utilized to store information regarding the various job histories of each of the glassware forming machines. The master data storage unit 31 can be a Model RL01 disk storage unit or combined with the system storage device 30 in the same unit. An auxillary storage unit (not shown) such as a Model RX02 floppy disk storage unit can be used for the storage and transfer of job histories from system to system. If such a floppy disk storage unit is used, a Model RXV21 dual drive floppy disk controller (not shown) can be used to control the data transferred between the auxillary data storage device and the FSC 24. It will be appreciated that further auxillary memory units (not shown) can be connected to the FSC 24 to meet specific information input for storage needs. All of the above-discussed equipment is manufactured by the Digital Equipment Corporation of Maynard, Mass.

The MSC 25 is connected by a bidirectional line to a data storage unit 32. In the preferred embodiment of the invention, the data storage unit 32 would comprise the internal memory space of the MSC 25. In other words, the MSC 25 has a small amount of memory which is sufficient to perform the limited function as will be explained below. That small amount of internal memory is represented as the data storage unit 32. However, if the system requires additional memory, it may be desirable to provide extended memory space by adding external data storage units. Such extended memory space typically could be provided by a bubble memory storage unit or Model RX01 floppy disk storage units.

The MSC 25 is also connected to a bottle reject control panel 33 and a bottle reject station 34, both of which are similar to the prior art units described above. The MSC 25 can also be connected to a hot bottle sensor 35 which provides a count of the number of bottles produced by the system. The hot bottle sensor 35 typically can be a mechanical or optical counter combined with appropriate conventional interfacing logic.

The organization of the ISC 26 and its related components is as described in the prior art. The ISC 26 generates control signals to a valve block 36 through a section operator console 37. Input and output control for the ISC 26 to the console 37 and the valve block 36 and for the MSC 25 to the control panel 33 and the reject station 34 can be provided by utilizing Model DRV11 parallel input/output interface boards (not shown), manufactured by the Digital Equipment Corporation of Maynard, Mass. The valve block 36 is connected to a plurality of glassware forming mechanisms 38 for actuating the forming mechanisms in a timed predetermined sequence of steps to form the articles of glassware. The console 37 is provided with a remote start and stop station 39 to allow an operator to easily reach such control from both sides of the machine. A blank sensor 40 generates a signal to the ISC 26 upon the detection of a gob at the mold of an individual section 28. The signal of the sensor 40 can be utilized to adjust the timing of that particular individual section 28.

Figure 4:
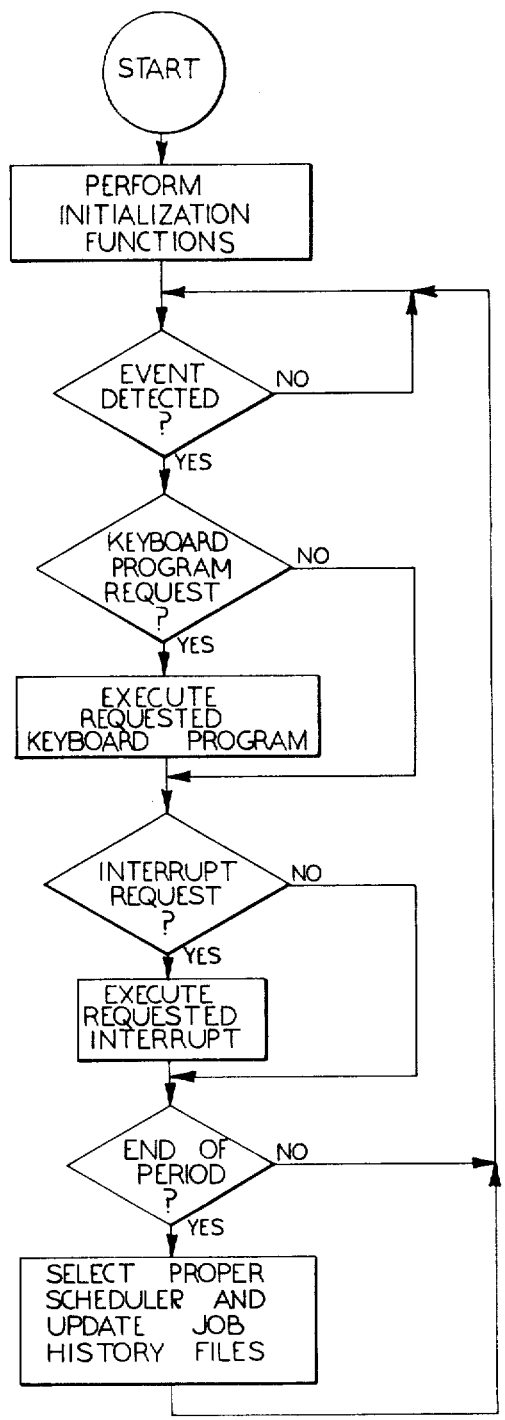
FIGS. 4 and 5 are simplified flow diagrams which are representative of a portion of the programs run by the forming supervisory computer of FIG. 3.

There is illustrated in FIG. 4 a simplified flow diagram of the main program of the FSC 24. The program is initiated at a circle START and immediately enters a processing point PERFORM INITIALIZATION FUNCTIONS. At this point, the FSC 24 will initialize the system clocks, interrupts, and other functions in preparation for operation. The program next enters a decision point EVENT DETECTED? An event is defined as either an operator-initiated demand, a program task interrupt request, or a periodic data update. If no event is detected, the program branches at NO back to the EVENT DETECTED? decision point. Thus, the program will wait until an event is detected.

If an event is detected, the program branches at YES to another decision point KEYBOARD PROGRAM REQUEST? If an operator has made a specific request through the inut/output device 29, the program branches at YES to a processing point EXECUTE REQUESTED KEYBOARD PROGRAM to satisfy that request. The program then enters another decision point INTERRUPT REQUEST? If no keyboard program has been requested, the program branches at NO directly to the decision point INTERRUPT REQUEST?

If the event detected is a priority interrupt, such as a clock or error interrupt, the program branches at YES to a processing point EXECUTE REQUESTED INTERRUPT to service the demand. The program next enters another decision point END OF PERIOD? If no interrupt request if detected, the program branches at NO directly to the decision point END OR PERIOD? Although interrupts are shown as a series function in FIG. 4, it should be understood the a priority interrupt will be serviced at any point in the program.

The FSC 24 generates operating reports and updates its job history files stored in the master data storage unit 31 at regular predetermined intervals. For example, machine timing changes can be updated and stored at ten minute intervals while a more general machine operation report can be generated hourly or at the end of each shift. Similarly, such information can be generated with each operator change. If the end of a particular period is detected, the program branches at YES to a processing point SELECT PROPER SCHEDULER AND UPDATE JOB HISTORY FILES. The program then returns to the decision point EVENT DETECTED? If the end of a particular reporting or updating period has not been reached, the program branches at NO directly to the EVENT DETECTED? decision point. It will be appreciated that the FSC 24 is continuously supervising the entire glassware forming system and generating and storing job history information upon operator demand and at regular predetermined intervals.

Figure 5:
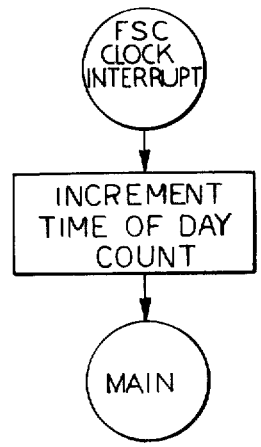

FIG. 5 illustrates a simplified flow diagram of the clock interrupt program for the FSC 24. The clock interrupt program is initiated at a circle FSC CLOCK INTERRUPT and immediately enters a processing point INCREMENT TIME OF DAY COUNT. The operation of the FSC 24 is not linked to the count total which represents the position of the glassware forming machine in the machine cycle. Rather, the FSC 24 operates with a real time clock in order to accurately perform the above-described periodic information requests. After the clock interrupt has been serviced, the program returns to the main program.

Figure 6:
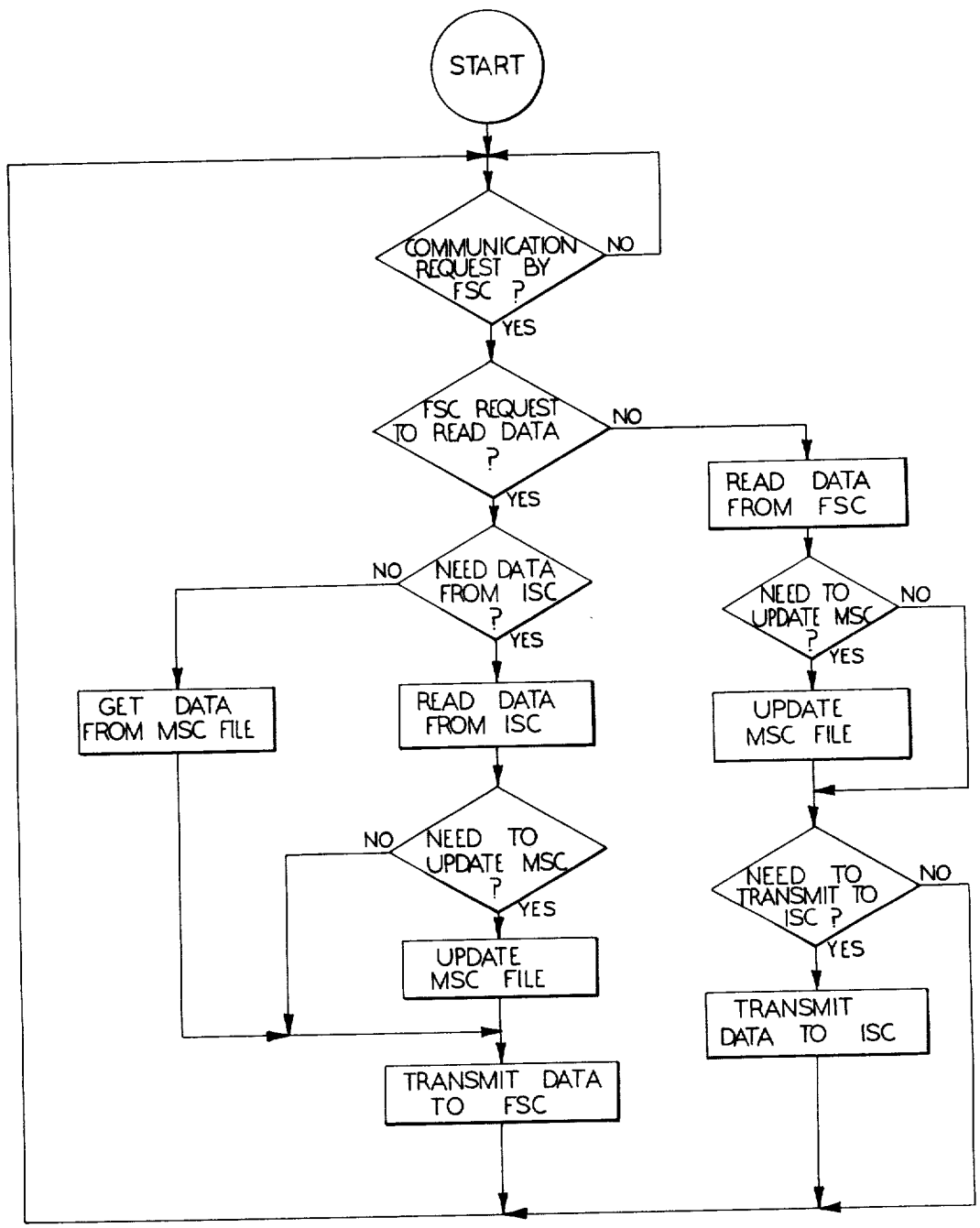
FIGS. 6 through 9 are simplified flow diagrams which are representative of a portion of the programs run by the machine supervisory computer of FIG. 3.

FIG. 6 illustrates a simplified flow diagram of the communications request program of the MSC 25. The program is initiated at a circle START and immediately enters a decision point COMMUNICATION REQUEST BY FSC? If no communication request has been received by the MSC 25, the program branches at NO back to the same decision point. Thus, the MSC 25 is constantly checking to determine if the FSC 24 desires to transmit or receive information. If such a communication request is detected, the program branches at YES to another decision point FSC REQUEST TO READ DATA?

If the FSC 24 requests that data be transferred to it from the MSC 25, the program branches at YES to another decision point NEED DATA FROM ISC? If the requested information is to be found in the storage space of the MSC 25, the program branches at NO to a processing point GET DATA FROM MSC FILE. The program then enters another processing point TRANSMIT DATA TO FSC, wherein the retrieved information is sent to the FSC 24. If, however, the information requested by the FSC 24 is to be found in the local memory of the ISC 26, the program branches from the NEED DATA FROM ISC? decision point at YES to a processing point READ DATA FROM ISC. The program next enters a decision point NEED TO UPDATE MSC? wherein it is determined if the information obtained from the ISC 26 should be stored in the local memory of the MSC 25. If so, the program branches at YES to a processing function UPDATE MSC FILE before entering the TRANSMIT DATA TO FSC processing function. If the obtained information is not required for local MSC 25 storage, the program branches at NO directly to the TRANSMIT DATA TO FSC processing point. Once the requested data has been transmitted to the FSC 24, the program returns to the decision point COMMUNICATION REQUEST BY FSC? to await a further demand by the FSC 24.

If the FSC 24 requests that data be transferred from it to the MSC 25, the program branches from the decision point FSC REQUEST TO READ DATA? at NO to a processing point READ DATA FROM FSC. The information received by the MSC 25 can either be stored in the MSC 25 or transferred down to an individual ISC 26 or both. The program enters a decision point NEED TO UPDATE MSC? If the data is to be stored in the MSC 25, the program branches at YES to a processing point UPDATE MSC FILE. The program then enters another decision point NEED TO TRANSMIT TO ISC? The program would branch directly from the NEED TO UPDATE TO MSC? decision point at NO to the decision point NEED TO TRANSMIT TO ISC? if local MSC 25 storage is not required.

If the data received by the MSC 25 is not to be transmitted to the individual ISC 26, the program branches at NO from the NEED TO TRANSMIT TO ISC? decision point back to the decision point COMMUNICATION REQUEST BY FSC? to await a further demand. If, however, the data is to be transmitted to the ISC 26, the program branches at YES to a processing point TRANSMIT DATA TO ISC before returning to the decision point COMMUNICATION REQUEST BY FSC?

Figure 7:
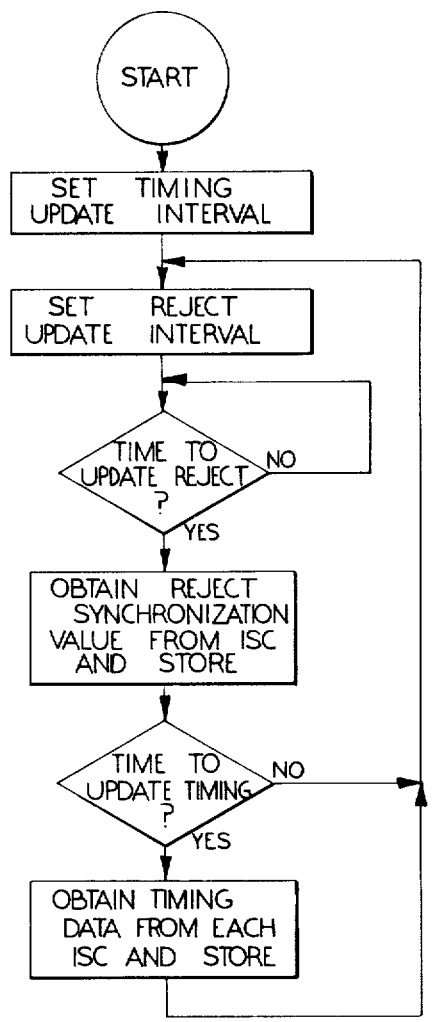

FIG. 7 illustrates a simplified flow diagram for the data update program of the MSC 25. The program is initiated at a circle START simultaneously with the above-described communication program. The program immediately enters a processing point SET TIMING UPDATE INTERVAL, which instructs the MSC 25 as to how long to wait between obtaining timing data from the ISC 26 for storage. The program next enters another processing point SET REJECT UPDATE INTERVAL, which performs a similar function for the reject data. The program next enters a decision point TIME TO UPDATE REJECT? If the predetermined reject update interval has been reached, the program will branch at YES to a processing point OBTAIN REJECT SYNCHRONIZATION VALUE FROM ISC AND STORE. If the reject update interval has not yet been reached, the program will branch at NO back to the decision point TIME TO UPDATE REJECT? until that interval is reached.

The program next enters another decision TIME TO UPDATE TIMING? If the timing update interval has been reached, the program will branch at YES to a processing point OBTAIN TIMING DATA FROM EACH ISC AND STORE before returning to the processing point SET REJECT UPDATE INTERVAL. If the timing update interval has not been reached, the program will branch at NO directly to the processing point SET REJECT UPDATE INTERVAL.

Figure 8:
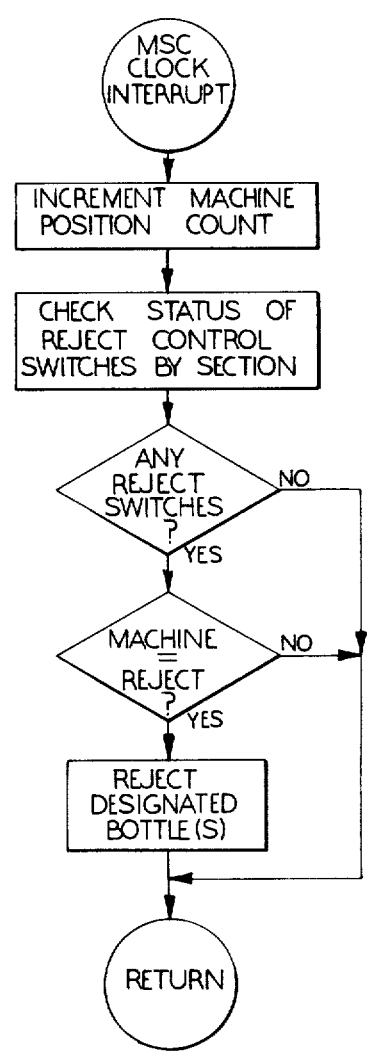

FIG. 8 illustrates a simplified flow diagram of the clock interrupt program from the MSC 25. The program is initiated at a circle MSC CLOCK INTERRUPT and immediately enters a processing point INCREMENT MACHINE POSITION COUNT to update a count total representing the position of the machine in the machine cycle. The program next enters a processing point CHECK STATUS OF REJECT CONTROL SWITCHES BY SECTION which instructs the MSC 25 to check the status of the reject control switches on the bottle reject control panel 33 by section. The program then enters a decision point ANY REJECT SWITCHES? to determine if any bottles have been designated for rejection. If any of the reject control switches are actuated, the program branches at YES to a decision point MACHINE=REJECT?, wherein the current machine position count total is compared with the reject synchronization value for each individual section. If they are equal, the program branches at YES to a processing point REJECT DESIGNATED BOTTLE(S), which includes instructions for generating a reject signal to the bottle reject station 34 such that the designated bottle(s) will be rejected. The clock interrupt program then returns to the main program at the point where the main program was interrupted, as is the case when the program branches at NO from the ANY REJECT SWITCHES? decision point when no switches are actuated or when the program branches at NO from the MACHINE=REJECT? decision point when the machine position count total is not equal to the reject synchronization value.

Figure 9:
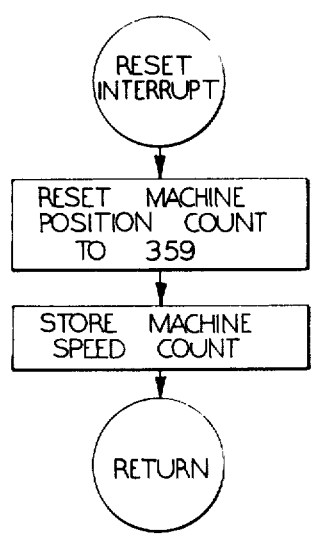

As previously described, 360 clock pulses or some multiple thereof, comprise one machine cycle. After 360° of clock pulses, a reset interrupt signal is generated. FIG. 9 illustrates a simplified flow diagram of the reset program for the MSC 25. The program is initiated at a circle RESET INTERRUPT and immediately enters a processing point RESET MACHINE COUNT TO 359. The program next enters another processing point STORE MACHINE SPEED COUNT, wherein the speed count of the glassware forming machine is stored in the local memory space of the MSC 25. The program then returns to the main program at the point the main program was interrupted.

Figure 10:
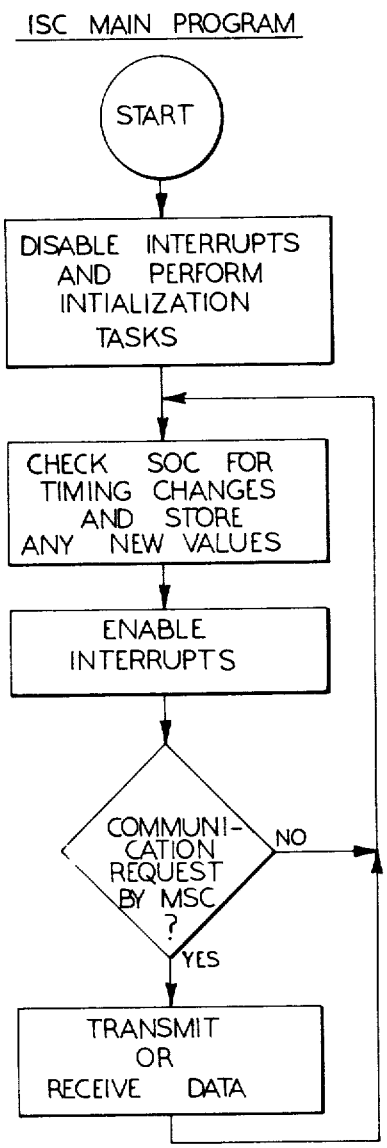
FIGS. 10 through 12 are simplified flow diagrams which are representative of a portion of the programs run by the individual section computer of FIG. 3.
Figure 12:
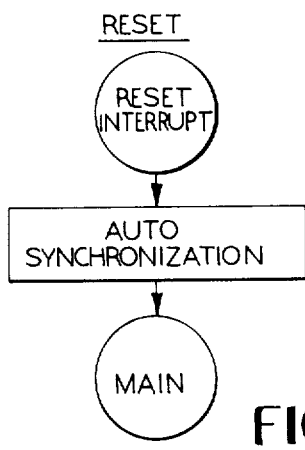
Figure 11:
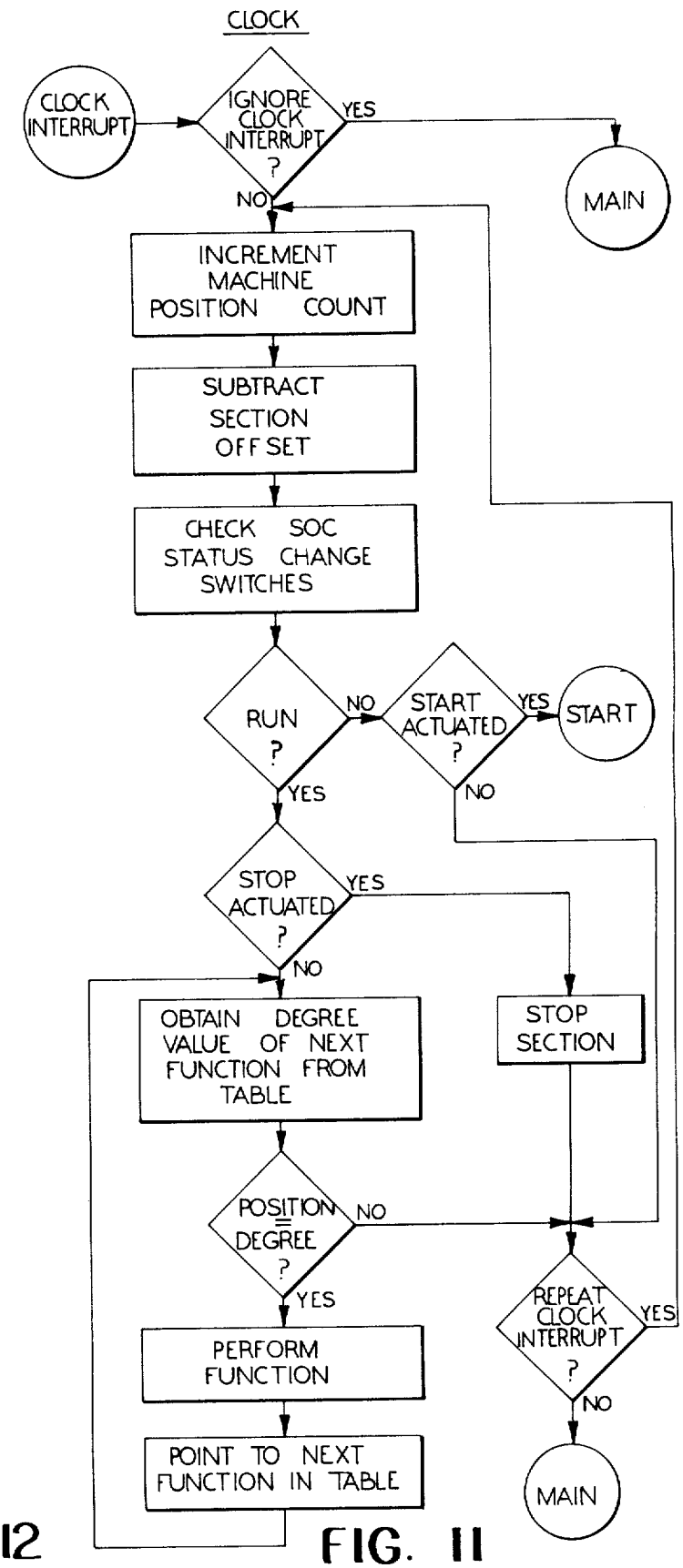

FIGS. 10 through 12 illustrate simplified flow diagrams which are representative of a portion of the programs run by the ISC 26. The operation of the ISC 26 is identical to the individual section computer 24 disclosed in U.S. Pat. No. 4,152,134 to Dowling et al. and that portion of the disclosure relating to the individual section computer 24 is incorporated herein by reference.

In summary, the present invention concerns an apparatus and method for collecting job history and other operating information from a system of glassware forming machines. Such information can be collected either upon operator request or at predetermined period intervals. For example, it may be desirable to generate a printed copy of the job history of an individual section glassware forming machine at intervals of approximately eight hours. Such a job history report can include a listing of the glassware-handling elements of the particular individual section by appropriate identification codes. Such identifying codes can be entered by the operator through a keyboard input/output device located near the glassware forming machine.

The job history report can also include manually read and entered data on the air pressures applied at various points in the forming process to blow molten glass to conform to the shape of the forming molds. Other reported information can include efficiency ratings of section performance compared against calculated ideal production rates, summaries of machine downtime, and ratios relating the number of bottles produced by a given cavity verses the number of such bottles rejected downstream by any of a number of conventional bottle-inspecting and cavity-identifying machines. It will be appreciated that virtually any aspect of the glassware forming process can be monitored by the FSC 24 by utilizing appropriate remote sensing probes, such as the hot bottle sensor 35, and interfacing logic, all of which is conventional in the art.

The above-described collected information can be displayed in several forms. Often, it is necessary for an operator to obtain the current timing data of the various forming operations during the 360° machine cycle. Such data can rapidly be made available in hard copy form by a conventional strip-chart printer located near the glassware forming machine. As illustrated in FIG. 13, the printed strip can include an identifying heading which specifies the particular section and machine, time of day, and date. Following the heading is a listing of each of the forming functions, including the times when each function is turned on and off. The on and off times are expressed by numbers representing the incremental degree position of the glassware forming machine, with 360° comprising one machine cycle.

Figure 14:
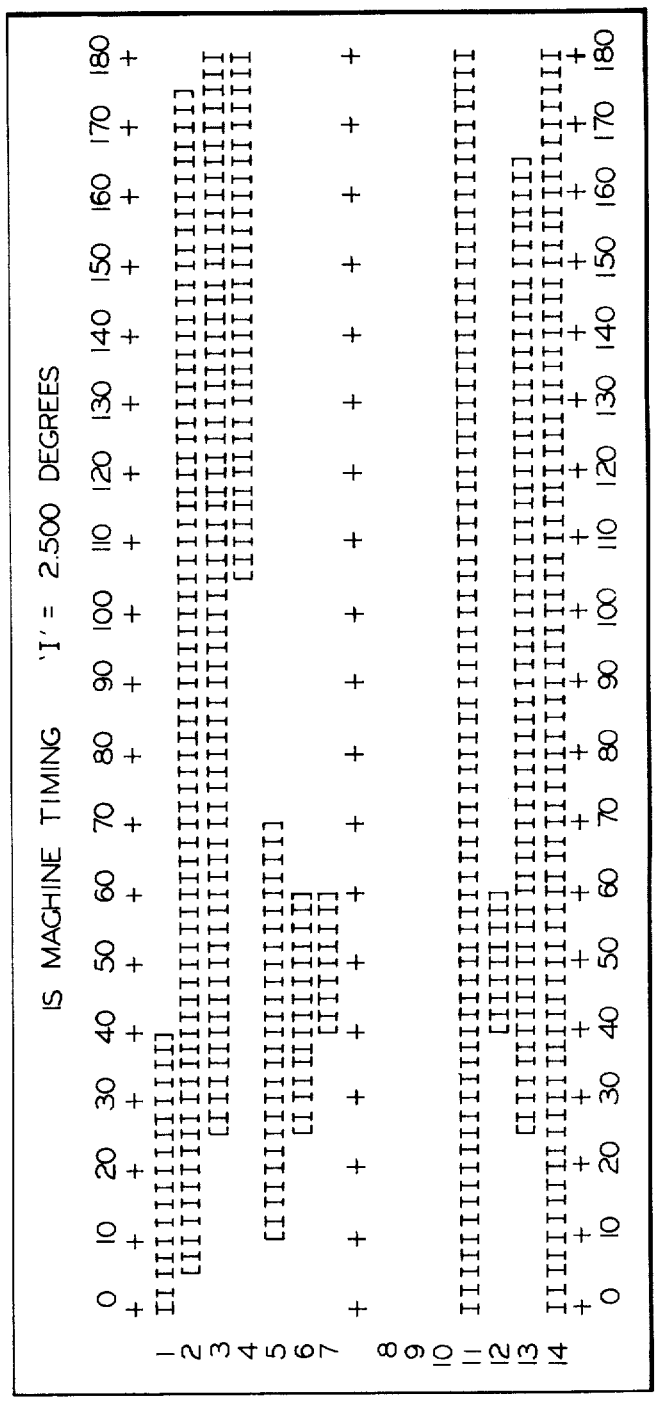
FIG. 14 is a representation of a bar chart visual display of the set of timing data shown in FIG. 13.

Alternatively, the section timing data can be displayed in diagrammatic form on a cathode ray tube or similar device. For example, FIG. 14 illustrates a bar chart visual display which has been found to be a helpful and easily readable method of displaying timing information. Such a chart can list the various forming functions along a vertical axis utilizing numerical codes representing each of the functions. The horizontal scale can represent the incremental degree positions of the glassware forming machine from 0° through 360° or any fractional and/or whole number of machine cycles. For the sake of convenience, only that portion of the horizontal scale from 0° through 180° is illustrated.

Although any desired resolution can be attained, it has been found that to divide the 360° spectrum of machine position into segments of 2.5° results in an easily readable display. On the illustrated chart, a mark such as an "I" can indicate that the particular forming function is turned on during the corresponding 2.5° segment of the 360° machine cycle. The absence of such a mark indicates that the particular forming function is turned off during that portion of the machine cycle. Brackets "[" and "]" can indicate the beginning and end respectively of the "on" portion of the machine cycle. It will be appreciated that such timing or other data can be displayed in forms other than that illustrated.

The present invention is related to an improvement in a glassware forming machine having a plurality of individual glassware forming sections, glassware forming means in each of the individual sections for forming glassware articles from the gobs of molten glass in a series of predetermined forming steps in response to a plurality of control signals, and control means for generating the control signals. The improvement comprises means for generating operating signals representing operations of the glassware forming means, and means responsive to the operating signals for generating a visual display having a representation of a forming operation along a first axis and a representation of the duration of the forming operation along a second axis.

The present invention is also related to a control system for a plurality of glassware forming machines. The control system includes means connected to the machines for generating operating signals, means for generating a visual display of the operating signals and means for storing the operating signals connected between the means for generating the operating signals and the means for generating a visual display. The means for generating the operating signals can include section control means and the means for storing can include the forming supervisory control means and a first storage means. The means for storing can also include the machine supervisory control means and a second storage means.

Although the section control means, the machine supervisory control means, and the forming supervisory control means have been disclosed in terms of programmed general purpose computers, it will be apparent to those skilled in the art that other forms of circuitry can be utilized to implement the present invention. An equivalent discrete component, hard wired circuit or an integrated circuit control means could be utilized to perform the functions of the present invention. Alternatively, a single general purpose computer could perform the functions of the forming supervisory control means, the machine supervisory control means, and the individual section control means on a time shared basis.

In accordance with the provisions of the patent statutes, the principle and mode of operation of the present invention has been explained and illustrated in their preferred embodiment. However, it must be understood that the invention can be practiced otherwise than as specifically illustrated and described without departing from its spirit or scope.

What is claimed:

1. A control system for a plurality of glassware forming machines each having a plurality of individual glassware forming sections, each section including glassware forming mechanisms for forming glassware articles from gobs of molten glass in a series of predetermined forming steps in response to a plurality of control signals and control means for generating the control signals, the control system comprising:
   a first storage means for storing control programs defining the series of predetermined forming steps and for storing operating information from the individual sections;
   a plurality of individual section control means, individual to each of the individual sections, for generating control signals to the glassware forming means in accordance with the control program and for generating operating signals representing operations of the glassware forming means;
   a plurality of machine supervisory control means, each connected to one or more of said plurality of said individual section control means associated with one of the plurality of glassware forming machines, for loading said control programs into and reading said operating signals from said associated individual section control means; and
   a forming supervisory control means connected between said first storage means and each of said machine supervisory control means for loading said control programs from said first storage means into said machine supervisory control means and for reading said operating signals from said machine supervisory control means into said first storage means.

2. The control system according to claim 1 wherein said forming supervisory control means includes means for updating said operating signals stored in said first storage means at predetermined intervals.

3. The control system according to claim 1 wherein said machine supervisory control means includes a second storage means for storing said control programs and said operating signals.

4. The control system according to claim 3 wherein said machine supervisory control means includes means for updating said operating signals stored in said second storage means at predetermined intervals.

5. A control system for a plurality of glassware forming machines, each forming machine having a plurality of individual glassware forming sections, each individual section having mechanisms for forming glassware articles from gobs of molten glass in a series of predetermined forming steps in response to plurality of control signals, and control means for generating the control signals, said control system comprising:
   a plurality of individual section control means, each one of which being associated with a corresponding one of the individual sections for generating operating signals representing the operations of the forming mechanisms;
   a plurality of machine supervisory control means, each one of which being associated with a corresponding one of the glassware forming machines and connected to a corresponding portion of said plurality of individual section control means for receiving said operating signals and providing a set of data signals representing an update of said operating signals at predetermined intervals for the corresponding one of the glassware forming machines;
   a plurality of machine supervisory storage means, each of which being associated with a corresponding one of said machine supervisory control means for storing successive sets of said data signals;
   a forming supervisory control means connected to each of said machine supervisory control means for reading and storing said stored sets of said data signals from said machine supervisory storage means through said machine supervisory control means; and
   means connected to said forming supervisory control means and responsive to said stored sets of said data signals for generating a visual display representing operating information based on said data signals taken for each of the glassware forming machines.

* * * * *